(No Model.)
J. A. YOUNG.
APPARATUS FOR DISINTEGRATING, MIXING, AND OTHER PURPOSES.
No. 472,421. Patented Apr. 5, 1892.
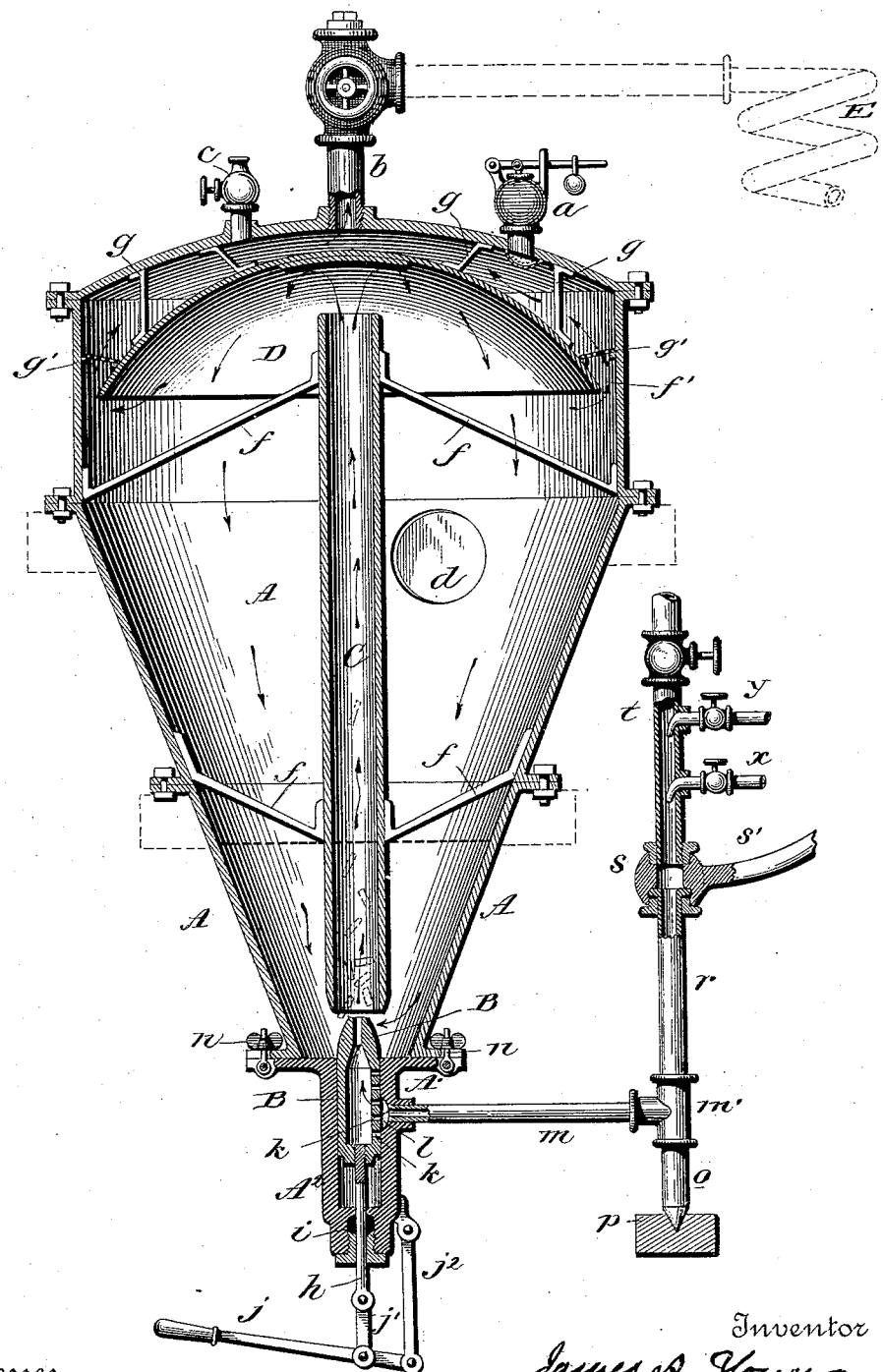

UNITED STATES PATENT OFFICE.

JAMES A. YOUNG, OF BOSTON, MASSACHUSETTS, ASSIGNOR, BY DIRECT AND MESNE ASSIGNMENTS, TO THE YOUNG COLORING COMPANY, OF SAME PLACE.

APPARATUS FOR DISINTEGRATING, MIXING, AND OTHER PURPOSES.

SPECIFICATION forming part of Letters Patent No. 472,421, dated April 5, 1892.

Application filed December 27, 1890. Serial No. 375,984. (No model.)

*To all whom it may concern:*

Be it known that I, JAMES A. YOUNG, of Boston, in the State of Massachusetts, have invented a new and useful Improvement in Apparatus for Disintegrating, Mixing, and for other Purposes, of which the following is a specification.

The apparatus in which my invention is comprised is one adapted for various uses—as, for example, for making wood pulp, for scouring or washing wool and other materials, or for thoroughly mixing chemical and other substances.

For the purpose of illustrating the invention I have represented the apparatus in the drawing accompanying this specification as applied to the making of wood pulp.

The apparatus consists, essentially, of a shell or closed vessel, a nozzle in the lower part thereof for injecting under high pressure the gaseous fluid—such as superheated steam, compressed air, or the like—used to act on the materials contained in the vessel, and a tube, or what may be called a "stand-pipe," open at both ends, supported in the vessel with its lower end above the nozzle and in position to receive the jet issuing from the latter. The jet of steam or the like issuing under great pressure from the nozzle passes up through the stand-pipe with great velocity, and drawing along with it from the lower part of the vessel the material to be treated carries the latter up through and discharges it forcibly from the stand-pipe, whence it descends again to the bottom of the vessel by gravity, to again go through the same course. The vessel is provided with an outlet, through which the steam, air, or other gaseous fluid after issuing from the stand-pipe can pass off, and this outlet is shielded by a crown-plate or hood placed over the discharge end of the stand-pipe, which plate can be and is in practice used by me as a deflector to direct the course of the material discharged from the stand-pipe, as well as a disintegrating-plate, against which material—such as wood—will be thrown with such force as to materially assist to break it up and disintegrate it.

Between the edges or periphery of the crown-plate and the walls of the vessel is an annular opening for the passage of steam to an outlet formed in the vessel above the crown-plate, and this annular opening is guarded by wire-gauze or the like, which will permit the steam to pass, but will arrest any particles of solid matter. The interior walls of the vessel taper toward the lower end, which is closed by a removable bottom, in which is mounted the injector-nozzle in such manner as to be adjustable up and down therein.

The nature of my invention will be readily understood by reference to the accompanying drawing, which represents in vertical central section an apparatus embodying the invention.

A represents a strong metallic vessel capable of sustaining high internal pressure. It is provided at the top with a suitable safety-valve $a$, an outlet $b$, and a small cock-controlled blow-off or vent $c$, the object of which will presently be explained. In the side of the vessel is an opening for the introduction of the material to be treated, which can be closed by any suitable device—such, for instance, as a gate-valve $d$. This opening in a large vessel usually is of a size to admit a man into the interior of the vessel for the purpose of making the internal repairs and adjustments which at times are required. The walls of the vessel preferably taper and converge toward the bottom, so as to provide the vessel with an interior surface, which will properly direct the material as it descends by gravity to the nozzle. The nozzle B enters the bottom of the vessel, and it is connected by piping to the source of gaseous fluid which is to be injected under pressure into the vessel. In the present instance it is supposed that the apparatus is used for making wood pulp, and in such case the nozzle should be connected with a source of superheated-steam supply. In practice I make use of superheated steam under a pressure of, say, from two hundred and fifty to five hundred pounds to the square inch.

Within the vessel is placed an upright stand-pipe C, which is supported therein by suitable braces and stay-rods $f$, attached to the vessel and to the stand-pipe. The lower end of this pipe is over the nozzle (bearing to it about the same relation that the combiningtube does to the steam-nozzle of an injector) in position to receive the jet issuing from the nozzle, the adjustment being such that there is between the two the proper opening or space needed to insure that action of the jet which will cause the material to be treated to be drawn into the lower end of the tube along with the steam. As this adjustment may vary for different kinds of material, I make the tube and the nozzle adjustable, the one to and from the other. In the present instance it is the nozzle which is adjustable. For this purpose the nozzle can slide up and down in a tubular extension $A^2$ of the bottom $A'$, in which it fits, and it is moved by means of a rod $h$, which passes out through a stuffing-box $i$ in the bottom of the extension, and is connected with any suitable means for actuating it—as, for example, the handle or lever $j$, connected to the rod by a link $j'$ and to the extension $A^2$ by a link $j^2$. The nozzle is provided with one or more steam-inlets $k$, which communicate with a pocket $l$ in the part $A^2$, into which the steam-pipe $m$ opens.

The stuff or material with which the vessel is charged can be discharged through any suitable opening in the bottom or lower part of the vessel. I prefer, however, to make the bottom itself movable for this purpose. To this end it makes a ground-joint with the lower edge or flange of the contracted lower end of the body of the vessel and is secured thereto by swinging latch-bolts $n$, and the steam-pipe $m$, which leads out from the extension $A^2$, has at its outer end a T $m'$, in the lower end of which is inserted a solid-steel rod $o$, stepped in a suitable fixed bearing $p$, and in the upper end of which is inserted the pipe $r$, which swivels at the top in a properly-formed coupling-piece $s$, which should have a stuffing-box to pack the pipe $r$. The coupling-piece $s$ is attached to and supported by a bracket-arm $s'$, fixed to any suitable stationary support, and at the top it is entered by a pipe $t$, which leads steam from the boiler to the pipe $r$. Under this arrangement the bottom $A'$, when disconnected from the body of the vessel, can swing on the parts $o\ r$ as an axis, so as to be moved out to one side, and thus to leave the open lower end of the vessel A unobstructed for the passage therefrom of the contents of the vessel.

The stand-pipe extends into the upper part of the vessel, and above it is the hood or crown-plate D, which is interposed between the open upper end of the pipe and the outlet $b$. This crown-plate, for the purposes of a wood-digester, is preferably of concavo-convex form, with its concave side toward the stand-pipe. The edges of the plate terminate a short distance from the walls of the vessel, so as to have between the two a small narrow annular opening $f'$ for the passage of the steam to the outlet $b$. The crown-plate is held in position by suitable means, such as stay-bolts $g$, and I guard the passage $f'$ by wire-gauze $g'$ or the like, which will permit the steam to pass, but will arrest particles of wood or other solid matter.

In practice when making wood pulp I prefer to preliminarily boil the wood chips in order to soften them. This can be accomplished by means of a perforated steam-coil connected with an outside source of steam-supply and located in the lower part of the vessel, so as to heat the water in which the chips are to be boiled, or by steam-jacketing the lower part of the vessel, or by the use of other known instrumentalities.

In the drawing it is supposed that the preliminary boiling of the wood has been finished and the superheated steam-jet has just been turned on. This jet issuing from the nozzle under very high pressure travels up through the stand-pipe with great velocity and acts to draw the chips into the lower end of the pipe and to drive them upward therethrough until they are discharged from the upper end of the pipe. When thus discharged, they strike with great force against the crown-plate, this action assisting and hastening their disintegration. The solid material is deflected by the crown-plate downward and toward the walls of the vessel, and as the material descends by gravity the inclination of these walls directs it to a position where it can be again taken up by the jet into and through the stand-pipe, and thus the operation proceeds until the material is thoroughly pulped. The steam escaping from the top of the stand-pipe expands in the enlarged dome or upper part of the vessel and passes off through the passage $f'$ to the outlet $b$. The steam issuing from the nozzle is so hot and dry that in the course of a very short time all of the water is taken up and carried off by it. Under these circumstances the wood if subjected to this great heat for any considerable length of time after the water has disappeared will be liable to burn or carbonize. To prevent this the steam can by suitable means be made wet whenever it becomes necessary—as, for example, water can be introduced into the steam before it reaches the nozzle. Provision for this is indicated in the drawing, $x$ being a cock-controlled pipe communicating on the one hand with a source of water-supply and on the other hand with the steam-pipe. In a similar way a pipe, such as $y$, may be provided, from which such chemicals as may be required can be drawn and supplied to the material while it is in course of treatment.

It is for the purpose of watching the condition of the material that the cock-controlled blow-off or sight-vent $c$ is provided. During the operation the experienced workman by opening the vent from time to time and observing the color of the jet issuing therefrom can determine when there is any approach to carbonizing action and can take preventive measures accordingly.

In practice I connect the outlet $b$ with a condenser E, in which the steam is condensed. As the steam carries off with it the volatile constituents of the wood I can by suitable processes recover from the water of condensation products such as wood-alcohol, creosote, &c.

By means of this apparatus I am enabled to thoroughly digest wood without the use of the chemicals ordinarily employed. Suitable chemicals, however, can be employed if desired; but whether they be used or not the digesting operation by the use of my apparatus is performed in very much shorter time than hitherto has been possible.

I claim—

1. The combination, with the vessel-body and the stand-pipe therein, of the bottom removably connected to the body and the injector-nozzle carried by and adjustable in said bottom, substantially as and for the purposes hereinbefore set forth.

2. The combination of the vessel-body, the stand-pipe, the nozzle, the crown-plate arranged within the vessel above the stand-pipe and below the vessel's top, so as to leave between the periphery of the plate and the walls of the vessel an annular steam-passage, wire-gauze for said passage, and the steam-outlet in the vessel above the crown-plate, under the arrangement and for operation as hereinbefore set forth.

In testimony whereof I have hereunto set my hand this 24th day of December, 1890.

JAMES A. YOUNG.

Witnesses:
EWELL A. DICK,
M. BAILEY.